June 10, 1930. T. DRABEK 1,762,919
TRACTOR HITCH
Filed Dec. 19, 1927
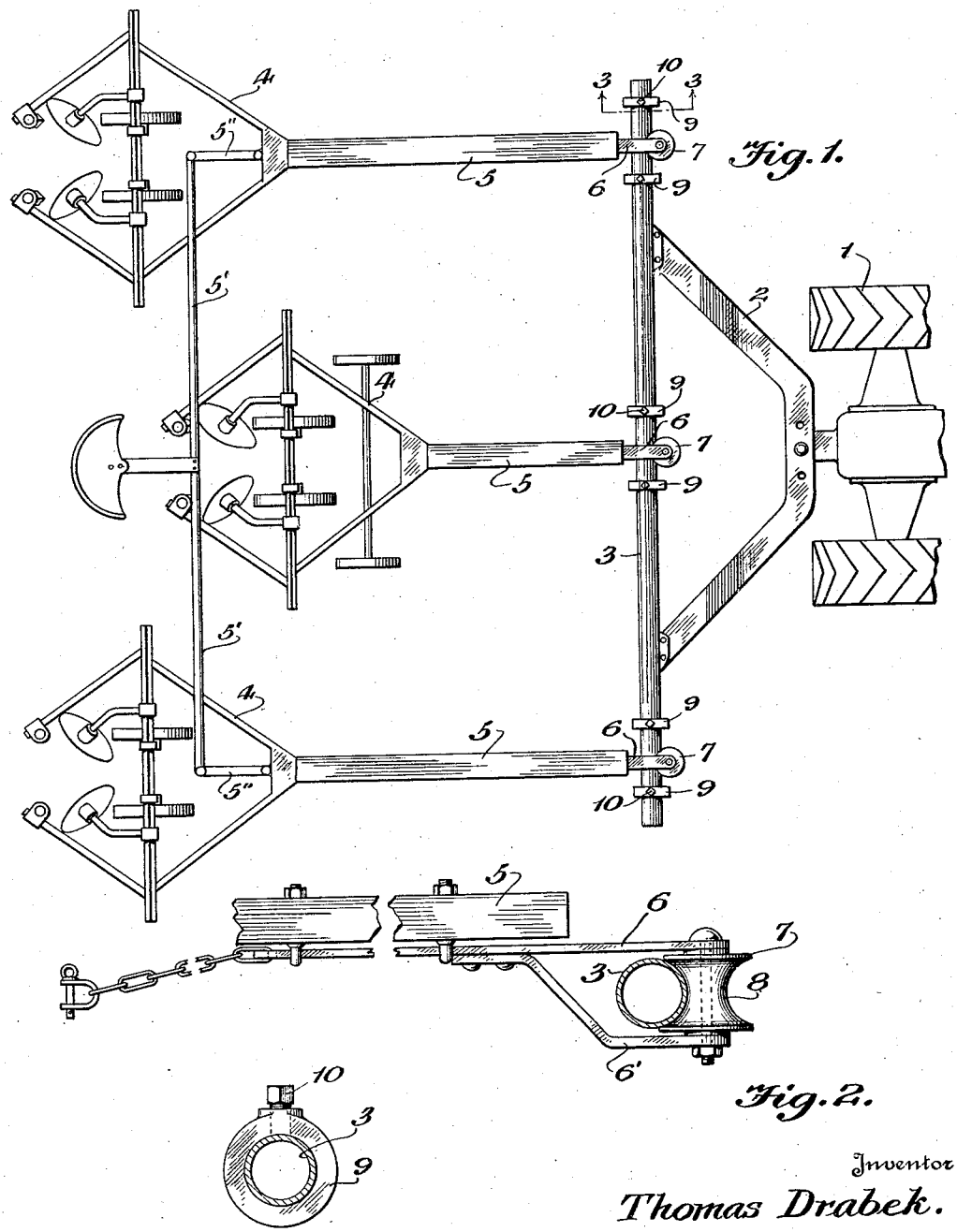

Patented June 10, 1930

1,762,919

UNITED STATES PATENT OFFICE

THOMAS DRABEK, OF WINNER, SOUTH DAKOTA

TRACTOR HITCH

Application filed December 19, 1927. Serial No. 241,189.

This invention relates to draft appliances and more especially to such devices as are employed in hooking up cultivators and the like to tractors.

An important object of the invention resides in the provision of means for connecting one or more lister cultivators to a tractor in such a way that a limited but variable amount of lateral movement is allowed the cultivator whereby the latter is capable of automatically adjusting itself to the rows no matter how crooked the rows may be.

Other objects and advantages of the invention will be apparent from the following description when taken in connection with the accompanying drawing; in which—

Figure 1 is a plan view of the improved hitch showing the same with three lister cultivators attached.

Figure 2 is a vertical section through the transverse bar or track of the hitch, and showing the cultivator tongue in elevation; and Figure 3 is a transverse section taken on line 3—3 of Figure 1, looking in the direction of the arrows.

Referring to the drawing in greater detail, the numeral 1 designates a tractor of any conventional construction and provided with usual rearwardly-extending tongue or draw-bar 2 to which the hitch of the present invention is attached.

The numeral 3 indicates a straight bar or track preferably of circular cross-section and of any desired length, although depicted herein as capable of accommodating three lister cultivators 4. This bar is rigidly mounted on the draw-bar 2 so as to extend transversely of the tractor. The outside cultivators 4 are provided with longer tongues 5 than is the middle cultivator, in order that these implements may be staggered in the manner shown.

The middle cultivator 4 is preferably mounted on wheels as shown, while the outside cultivators are prevented from tilting by reason of the cross bar 5' which is pivotally connected to the pivoted arms 5''.

The free end of each tongue 5 is provided with the vertically spaced arms 6 and 6' which extend above and below the bar 3 and project beyond the same so as to serve as bearings for the rollers 7. These rollers 7 are provided with concaved working faces 8 which snugly engage the forward side of the bar 3 and transmit the tractive force from the tractor to the cultivators associated with each of the tongues 4.

By thus mounting the ends of the tongues 4 on the transversely extending bar 3, it will be apparent that the cultivators are permitted a lateral movement with respect to the forward line of travel of the tractor, due to the freedom of movement of the tongues 5 with respect to the bar 3. It will thus be apparent that the cultivators 4 may automatically adjust themselves to any irregularities in the rows along which they may be traveling.

In order to limit the extent of this lateral movement of the cultivators when working in crooked rows as well as to properly adjust them with respect to the length of the bar 3 where more than one cultivator is employed, I have provided the adjustable stops 9. These stops comprise rings of a diameter to permit a slidable fit on the bar 3 and set screws 10 by which the rings may be locked to the bar after being moved to adjusted position.

From the foregoing description taken in connection with the accompanying drawing it will be apparent to those skilled in the art that I have devised an exceedingly simple hitch by which one or more cultivators may be associated with a tractor in various relative transverse positions; that the hitch is so designed as to permit of an automatic lateral movement of the implements associated therewith whereby the implements may adjust themselves to irregularities in the rows being operated upon; and that the extent of lateral movement may be varied to suit requirements.

In accordance with the patent statutes I have described what I now believe to be the best embodiment of the invention but it is to be understood that the structure disclosed herein is susceptible of various minor changes without departing from the spirit of the invention, and all such I aim to include within the scope of the appended claims.

What I claim as new and desire to secure by Letters Patent is:

1. A tractor hitch including a bar mounted transversely of the rear end of a tractor, a plurality of cultivator tongues each provided with vertically spaced arms extending above and below said bar, rollers provided with concaved surfaces mounted between the ends of the arms of respective tongues and adapted to roll upon said bar, collars slidably mounted on said bar on opposite sides of each of said tongues, and set screws for adjustably securing said collars in place.

2. A tractor hitch comprising a tongue attached to the tractor and extending beyond the rear end thereof, a cylindrical bar secured to the rear end of said tongue and extending transversely of the longitudinal axis of the tractor, a plurality of cultivators, tongues on said cultivators, rollers provided with concaved surfaces and mounted on the ends of the respective cultivator tongues, said rollers adapted to roll upon said bar, collars slidably mounted on said bar on opposite sides of each of said rollers, and set screws for adjustably securing said collars in place, whereby a limited lateral movement is provided for each cultivator.

THOMAS DRABEK.